250/201 OR 4,485,303

United States Patent [19]

Suzuki

[11] Patent Number: 4,485,303

[45] Date of Patent: Nov. 27, 1984

[54] FOCUS DETECTION WITH SPLITTER LENS

[75] Inventor: Takeomi Suzuki, Tokyo, Japan

[73] Assignee: Asahi Kogaku Kogyo Kabushiki Kaisha, Tokyo, Japan

[21] Appl. No.: 403,473

[22] Filed: Jul. 30, 1982

[30] Foreign Application Priority Data

Jul. 31, 1981 [JP] Japan ................................ 56-119326

[51] Int. Cl.[3] ................................................ G01J 1/20

[52] U.S. Cl. ...................................... 250/201; 250/204

[58] Field of Search ............... 250/201, 204, 216, 578; 350/169, 171, 172; 354/402, 406; 356/4

[56] References Cited

U.S. PATENT DOCUMENTS 4,246,476 1/1981 Stauffer ................................ 250/201

4,373,791 2/1983 Araki .................................... 250/201

4,417,139 11/1983 Kusaka ................................ 354/406

4,450,547 5/1984 Nakamura et al. ................. 250/204

*Primary Examiner*—David C. Nelms

*Assistant Examiner*—J. Brophy

*Attorney, Agent, or Firm*—Browdy and Neimark

[57] ABSTRACT

A light beam splitter includes a splitter lens a light flux splitter, in which a splitter lens is disposed such that a light beam, having passed through substantially one half of the light emission area of a focusing lens defined by a substantial border line constituted by a straight line passing through the center of the light emission area and dividing the area into two regions, is incident on light receiving elements in one of two light receiving element arrays and a light beam having passed through the other region is incident on light receiving elements in the other light receiving element array individually corresponding to the first-mentioned light receiving elements.

2 Claims, 3 Drawing Figures

FOCUS DETECTION WITH SPLITTER LENS

FIELD OF THE INVENTION

The present invention relates to light splitters used for automatic focusing devices, light measuring devices and so forth, which function to cause two light beams having passed through respective regions of the light emission area of a focusing lens to be incident on respectively corresponding light receiving elements in two light receiving element arrays by the action of a lens.

BACKGROUND OF THE INVENTION

Hitherto, focus detection devices have used contrast detection means (or a beam splitter), which uses light receiving elements arranged in two arrays such that two light beams obtained as a result of splitting a light beam are made to be incident on corresponding light receiving elements in the respective light receiving element arrays, and there has been an amplitude division method which is used for such detecting means and which makes use of a semi-transparent mirror. The ratio between the transmittivity and reflectivity of such a semi-transparent mirror is varied by depositing a metal (such as Al, Ag or Au) or a non-metal (such as ZnS, CeO or $TiO_2$) to a suitable thickness.

However, it has been very difficult to accurately control the ratio of the light beam splitting with the film thickness. In addition, light is greatly absorbed, and also the division ratio is subject to great variations with respect to polarization and wavelengths.

Meanwhile, there has also been in practice a method which is based not on amplitude splitting, such as with the use of a semi-transparent mirror, but on wavefront splitting in a split image system for a focus detecting device. In the split image system, light receiving elements are used which are arranged in a row such that two adjacent light receiving elements cooperate with each other to receive respective split light beams. However, no system which uses two light receiving element arrays having corresponding light receiving elements spaced apart from one another to form respective light receiving element pairs to receive respective split light beams, has been used in any split image system or contrast system involving wavefront splitting of a light beam.

SUMMARY OF THE INVENTION

An object of the present invention is to provide a light beam splitter, in which a splitter lens is disposed such that a light beam, having passed through substantially one half of the light emission area of a focusing lens defined by a substantial border line constituted by a straight line passing through the center of the light emission area and dividing the area into two regions, is incident on light receiving elements in one of two light receiving element arrays, and a light beam having passed through the other region is incident on light receiving elements in the other light receiving element array individually corresponding to the first-mentioned light receiving elements. With a light beam splitter having this two-array construction, the splitting ratio is less subject to fluctuations with respect to polarization and wavelengths, and also this tight beam flux splitter can be readily manufactured.

BRIEF DESCRIPTION OF THE DRAWINGS

The present invention will now be described with reference to the drawings.

DETAILED DESCRIPTION OF PREFERRED EMBODIMENTS

Figure 1:
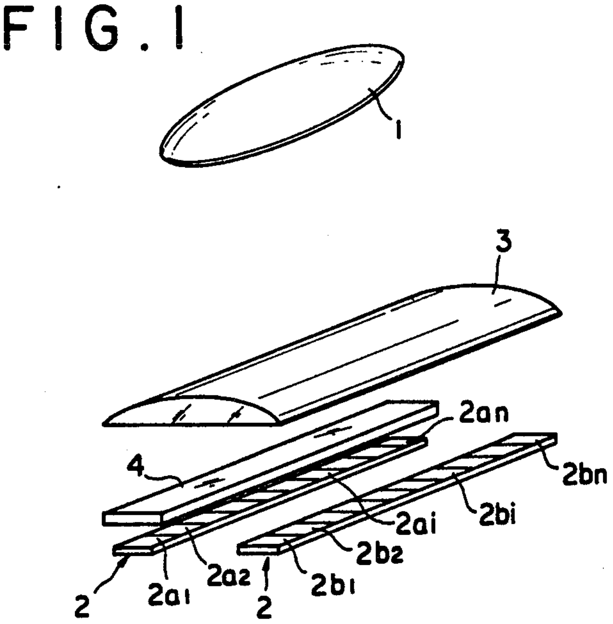
FIG. 1 is a schematic perspective view showing an embodiment of the light beam splitter according to the present invention.
Figure 2:
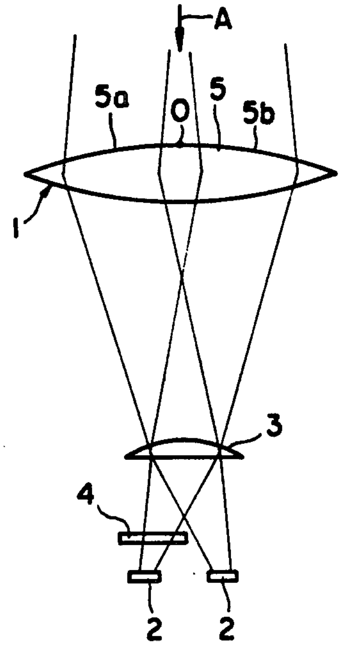
FIG. 2 is a schematic optical path diagram showing the way in which the light beam splitter splits a light beam.
Figure 3:
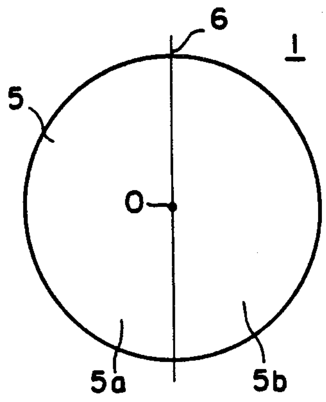
FIG. 3 is a plan view showing a focusing lens of FIG. 2 taken in the direction of arrow A.

FIGS. 1 through 3 show one embodiment of the present invention. In the figures, a focusing lens is designated at 1, and light receiving element arrays are designated at 2. The individual light receceiving element arrays 2 consist of light receiving elements $2a_1 \ldots 2a_i \ldots 2a_n$ and light receiving elements $2b_1 \ldots 2b_i \ldots 2b_n$, these elements being arranged in a row in each array. The light receiving elements $2a_1$ and $2b_1$ correspond to each other, the elements $2a_i$ and $2b_i$ to each other, and likewise the elements $2a_n$ and $2b_n$ to each other. These element arrays are adapted to receive the respective split light beams. Designated at 3 is a splitting lens which is interposed between the focusing lens 1 and the light receiving element arrays 2. In the Figures, the splitting lens 3 is a cylindrical lens which is disposed to extend along the light receiving element arrays 2. Designated at 4 is a phase plate which is used when providing a difference in the light path between the light receiving elements 2 in the individual arrays.

The optical parts as described above are disposed in a manner as shown in FIGS. 2 and 3. The light emission area 5 of the focusing lens 1 is divided into two regions 5*a* and 5*b* by a substantial boundary line constituted by a straight line 6 passing through its center 0. The light receiving element arrays 2, splitter lens 3 and phase plate 4 are disposed to extend parallel to the straight line 6.

The light beam is made to be incident on the two light receiving element arrays of the above construction after it is split into the two beams in the following way. The split light beam passed through the region 5*a* of the two regions 5*a* and 5*b* defined by the straight line 6 in the light emission area 5 of the focusing lens 1 is transmitted through the splitter lens 3 to be incident on, for instance, the light receiving element $2b_i$ of the light receiving element array 2. On the other hand, the other split light beam having passed through the other region 5*b* is transmitted through the splitter lens 3 and then through the phase plate 4 to be incident on the light receiving element $2a_i$ of the light receiving element array 2. In this way, the light beam is split into two light beams incident on the respective light receiving elements $2a_i$ and $2b_i$. While the light emission area 5 is split into the two regions 5*a* and 5*b* by a substantial boundary line which is a straight line passing through the center 0 of the emission area 5, to vary the beam division ratio from 50:50, the boundary line may be subjected to a parallel displacement near the straight line 6 passing through the light emission area center 5.

As has been described in the foregoing, according to the present invention, according to which the light beam division ratio is effected not through the control of the thickness of a reflection film but through the adjustment of the ratio of the area of incidence of light beam in the light incidence area, it is possible to obtain a light beam splitter having a desired division ratio. In addition, since no optical member having a reflection film is used, the ratio is less subject to fluctuations with respect to the polarization and wavelengths, while the manufacture is simplified as it need not include the cumbersome procedure of maintaining film thickness.

It will be obvious to those skilled in the art that various changes may be made without departing from the scope of the invention and the invention is not to be considered limited to what is shown in the drawings and described in the specification.

What is claimed is:

1. A light beam splitter, comprising:

a focusing lens;

a pair of light receiving element arrays, each of said arrays having individual light receiving elements, the individual light receiving element of one said array corresponding to the individual light receiving elements of the other said array;

a splitter lens disposed with respect to said focusing lens such that a light beam, having passed through substantially one half of the light emission area of said focusing lens, defined by a substantial border line constituted by a straight line passing through substantially the center of the light emission area of said focusing lens and dividing such area into two regions, is incident on the light receiving elements of one of said arrays and a light beam having passed through the other region of said light emission area is incident on corresponding light receiving elements in the other of said arrays.

2. A light beam splitter in accordance with claim 1, further including phase plate means disposed between said splitter lens and one of said light receiving elements, for providing a difference in the light path between said light receiving elements arrays.

* * * * *